US009276830B2

(12) United States Patent
Mendel et al.

(10) Patent No.: US 9,276,830 B2
(45) Date of Patent: Mar. 1, 2016

(54) SECURE ELECTRONIC ELEMENT NETWORK

(75) Inventors: Jacob Mendel, Kibbutz Givat Brenner (IL); Alexander Potievsky, Kfar Saba (IL)

(73) Assignee: Broadcom Corporation, Irvine, CA (US)

( * ) Notice: Subject to any disclaimer, the term of this patent is extended or adjusted under 35 U.S.C. 154(b) by 243 days.

(21) Appl. No.: 13/478,383

(22) Filed: May 23, 2012

(65) Prior Publication Data

US 2013/0060934 A1 Mar. 7, 2013

Related U.S. Application Data

(60) Provisional application No. 61/531,507, filed on Sep. 6, 2011.

(51) Int. Cl.
*G06F 15/173* (2006.01)
*H04L 12/26* (2006.01)
*H04L 12/24* (2006.01)

(52) U.S. Cl.
CPC ........ *H04L 43/0817* (2013.01); *H04L 41/0654* (2013.01); *Y04S 40/166* (2013.01); *Y04S 40/168* (2013.01)

(58) Field of Classification Search
CPC ............ H04L 67/1051; H04L 43/0817; H04L 41/0654; Y04S 40/166; Y04S 40/168; G06F 15/173
USPC .............. 709/201, 208, 209, 211, 224; 700/3, 700/101; 713/170, 190
See application file for complete search history.

(56) References Cited

U.S. PATENT DOCUMENTS

| | | | | |
|---|---|---|---|---|
| 6,597,956 B1* | 7/2003 | Aziz | .................. | G06F 9/45504 700/101 |
| 6,788,989 B2* | 9/2004 | Kodama | ........................ | 700/117 |
| 8,151,118 B2* | 4/2012 | Foster et al. | .................. | 713/189 |
| 2003/0126265 A1* | 7/2003 | Aziz et al. | ..................... | 709/227 |
| 2006/0020705 A1* | 1/2006 | Paek | ....................... | H04L 69/16 709/228 |
| 2006/0026422 A1* | 2/2006 | Bade et al. | ..................... | 713/164 |
| 2007/0028104 A1* | 2/2007 | Cohen | ..................... | H04L 63/08 713/170 |
| 2007/0101156 A1* | 5/2007 | Novoa | ................... | G06F 21/575 713/190 |
| 2007/0111662 A1* | 5/2007 | Beckers | ................ | H04W 48/16 340/13.2 |
| 2008/0183305 A1* | 7/2008 | Foster | ..................... | G06F 21/85 700/3 |
| 2009/0070838 A1* | 3/2009 | Pham | ................. | H04N 7/17336 725/105 |
| 2012/0083902 A1* | 4/2012 | Daum | ................... | H04B 3/548 700/3 |

\* cited by examiner

*Primary Examiner* — Ario Etienne
*Assistant Examiner* — Kidest Mendaye
(74) *Attorney, Agent, or Firm* — Brinks Gilson & Lione

(57) ABSTRACT

A secure network of electronic elements ("network") ensures the electronic elements that implement an electronic device are functioning properly. The network selects at least one master electronic element to consistently check that each of the electronic elements are functioning properly. When the master electronic element identifies that an electronic element is not functioning properly, the network executes a predefined response, such as a counter measure that limits the functional capability of the improperly functioning electronic element or other electronic elements. Electronic elements can identify when a master electronic element is improperly functioning by observing that the master electronic element has ceased checking on the electronic elements. The secure network can then execute a response that includes the counter measure of limiting the functional capability of the improperly functioning master electronic element and assigning a new master electronic element.

20 Claims, 4 Drawing Sheets

SECURE ELECTRONIC ELEMENT NETWORK

1. CROSS REFERENCE TO RELATED APPLICATIONS

This application is related to and claims priority from U.S. Provisional Application Ser. No. 61/531,507, entitled "Secure Electronic Element Network" and filed on Sep. 6, 2011, the contents of which are hereby incorporated by reference in their entirety.

BACKGROUND

1. Technical Field

This disclosure relates to a network of electronic elements in an electronic device. More specifically, this disclosure relates to securely ensuring the proper functioning of a network of electronic elements in an electronic device.

2. Related Art

With the rapid advance of technology in the past decades, complex electronic devices are in widespread use in virtually every context of day to day life. The electronic devices may often be quite simple, but often have hundreds or thousands of individual electronic elements that are needed to implement the device. Software frequently interfaces with the electronic components, allowing a user to properly use all of the features of the electronic device. Improvements in security measures for such devices will help continue to drive the widespread adoption and demand for such devices.

BRIEF DESCRIPTION OF THE DRAWINGS

The system may be better understood with reference to the following drawings and description. In the figures, like reference numerals designate corresponding parts throughout the different views.

DETAILED DESCRIPTION

Figure 1:
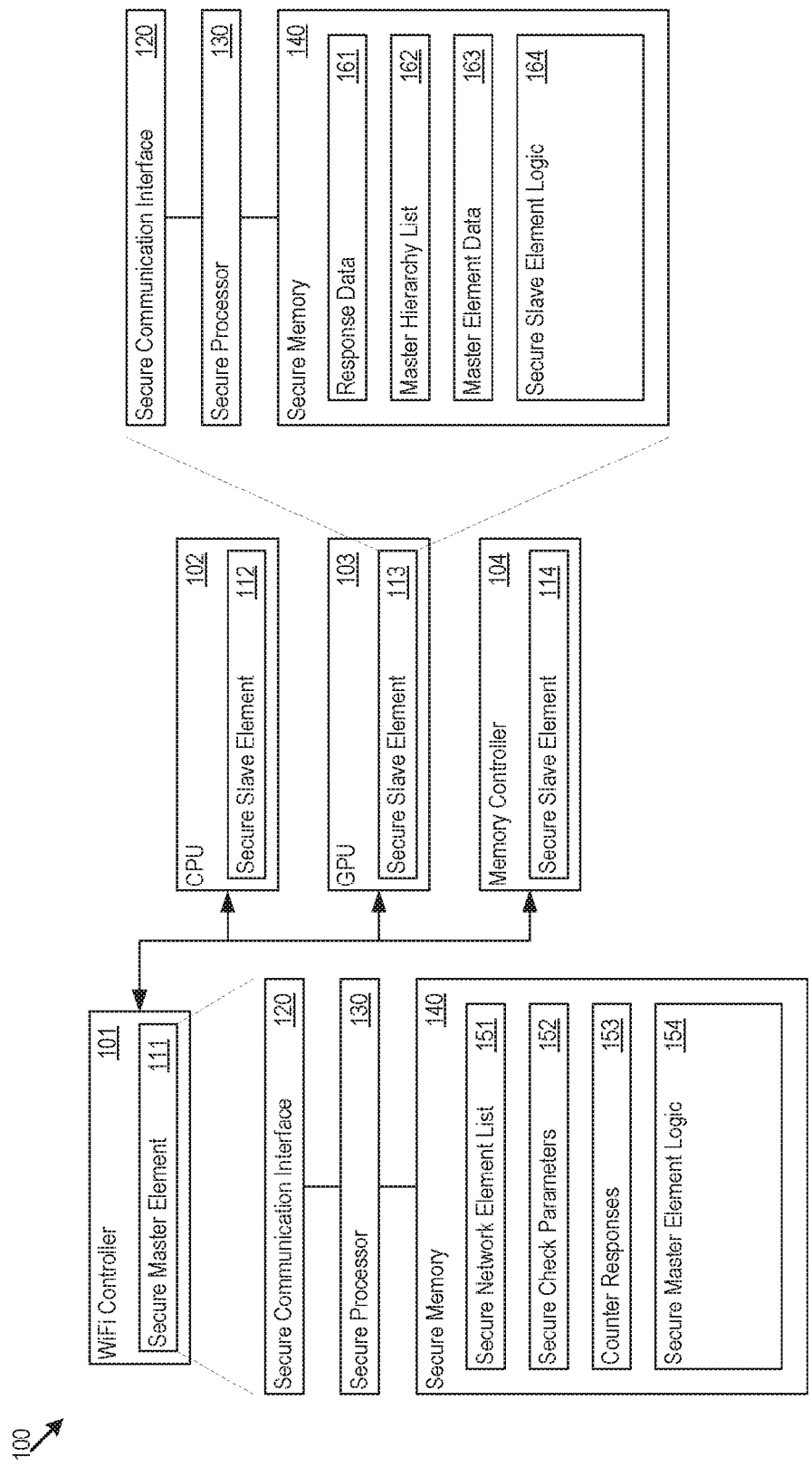
FIG. 1 shows an exemplary network of secure electronic elements.

FIG. 1 shows an exemplary network of secure electronic elements 100. A network of secure electronic elements 100 may include electronic elements (e.g., 101-104) that implement, at least in part, an electronic device. As examples, the electronic device implemented by the network of secure electronic elements 100 may be a laptop, desktop, or other type of computer, a personal data assistant, or a portable email device. Additional examples of electronic devices include televisions, stereo equipment such as amplifiers, pre-amplifiers, and tuners, home media devices such as compact disc (CD)/digital versatile disc (DVD) players, portable MP3 players, high definition (e.g., Blu-Ray™ or DVD audio) media players, or home media servers. Other examples of electronic devices include vehicles such as cars and planes, societal infrastructure such as power plants, traffic monitoring and control systems, or radio and television broadcasting systems. Further examples include home climate control systems, washing machines, refrigerators and freezers, dishwashers, intrusion alarms, audio/video surveillance or security equipment, network attached storage, and network routers and gateways. The electronic devices may be found in virtually any context, including the home, business, public spaces, or automobile. Thus, as additional examples, the electronic devices may further include automobile engine controllers, audio head ends or DVD players, satellite music transceivers, noise cancellation systems, voice recognition systems, climate control systems, navigation systems, alarm systems, or other devices.

In FIG. 1, the network of secure electronic elements 100 includes electronic elements, such as a WiFi Controller 101, a Central Processing Unit (CPU) 102, a Graphical Processing Unit (GPU) 103, and a Memory Controller 104. The electronic elements (e.g., 101-104) may implement, at least in part, one of the electronic devices listed above. The electronic elements may vary widely in form, function, and complexity. As additional examples, in the context of a computer system, the electronic elements may further include input/output interfaces (e.g., Universal Serial Bus (USB)) interfaces, clock or timer logic, programmable voltage regulators, flash memory interfaces, or firmware ROMs (e.g., a basic input/output system (BIOS) ROM. As another example, in the context of an automobile, the electronic elements may include an engine controller, a global positioning system (GPS) navigation system, an audio processing computer, and a climate control computer. As explained in more detail below, electronic elements with sufficient processing capability may change from slave electronic elements to master electronic elements.

Each of the electronic elements (e.g., 101-104) may include a secure element (e.g., 111-114). As discussed in greater detail below, the secure element (e.g., 111-114) of each electronic element (e.g., 101-104) may work together to secure the network of secure electronic elements 100 by determining whether each electronic element is functioning properly. In one implementation, a secure element (e.g., 111-114) may be embedded within an electronic element (e.g. 101-104), forming, for example, a single electronic chip or being included in a single package of multiple individual blocks of circuitry. Alternatively, the secure element (e.g., 111-114) may be separate from, but in communication with, the electronic element (e.g., 101-104). The secure element associated with an electronic element may also control or alter the electronic element's functional capability. As illustrative examples, a secure element may slow the clock speed of a CPU 102 or a GPU 103, disable wireless radios of a WiFi Controller 101, or power down or shut down the electronic element.

The network of secure electronic elements 100 may include master electronic elements and slave electronic elements. In operation, a master electronic element may check, at defined times, whether a selected slave electronic element is functioning properly. The master electronic element may check whether some or all of the slave electronic elements within the network of secure electronic elements 100 are functioning properly. In the exemplary network 100 depicted in FIG. 1, the WiFi Controller 101 is a master electronic element. Also in FIG. 1, the CPU 102, the GPU 103, and the Memory Controller 104 are each slave electronic elements. A master electronic element (e.g., the WiFi Controller 101) may include a Secure Master Element (e.g., 111) while the slave electronic elements (e.g., 102-104) may each include a Secure Slave Element (e.g., 112-114). The master electronic element (e.g., the WiFi Controller 101) may open a channel of communication with each of the slave electronic elements (e.g., the CPU 102, the GPU 103, and the Memory Controller 104).

As the master electronic element, the WiFi Controller 101 may include a Secure Master Element 111. The Secure Master Element 111 may include a Secure Communication Interface 120 in communication with a Secure Processor 130 and a Secure Memory 140. The Secure Memory 140 of the Secure Master Element 111 may store a Secure Network Element List 151, Secure Check Parameters 152, Counter Responses 153, and Secure Master Element Logic 154. The Secure Master Element Logic 154 may be stored as processor executable instructions that when executed by the secure processor 130 determine whether selected slave electronic elements are functioning properly as well as to react accordingly.

In FIG. 1, the Secure Master Element 111 may direct the WiFi Controller 101 to act as the master electronic element of the network of secure electronic elements 100. The Secure Master Element Logic 154 may select which slave electronic elements to check by reading the Secure Network Element List 151. The Secure Network Element List 151 may list the CPU 102, the GPU 103, the Memory Controller 104, or any other electronic elements in the network 100 as slave electronic elements. In other words, the Secure Master Element Logic 154 may check whether any specified elements in the secure network element list 151 are functioning properly.

The Secure Master Element Logic 154 may determine whether the CPU 102, the GPU 103, and the Memory Controller 104 (the slave electronic elements) are functioning properly by utilizing the Secure Check Parameters 152. The Secure Check Parameters 152 may include the proper response that the check to each of the slave electronic elements should respectively return. For example, the Secure Check Parameters 152 may specify that the proper response from checks to the Memory Controller 104 should be a "Yes" response. Additionally, the Secure Check Parameters 152 may also specify more complex responses (e.g., a sequence of data or messages, ranges of permissible responses, or other acceptable responses) from checked slave electronic elements. For example, an electronic element may return the particular location of a damaged portion of the electronic element as its response. The Secure Check Parameters 152 may also store the frequency with which the Secure Master Element Logic 154 should check each slave electronic element. As an example, the Secure Master Element Logic 152 of the WiFi Controller 101 may check the CPU 102 every 5 milliseconds, the GPU every 10 milliseconds, and the Memory Controller every 500 milliseconds in accordance with the Secure Check Parameters 152. The Secure Check Parameters 152 may also specify a threshold of received non-proper responses before the Secure Master Element Logic 154 will take action. As an example, the Secure Check Parameters 152 may specify a certain number or a certain frequency of non-proper responses before the Secure Master Element Logic 154 will consider the responding electronic element to be improperly functioning and then execute a counter response.

The Counter Responses 153 may specify the response to take in the event the master electronic element receives a non-proper response from a checked slave electronic element. The Counter Responses 153 may be customized depending on the particular type of electronic device the network of secure electronic elements 100 implements. For example, a network of secure electronic elements 100 may implement a high priority electronic device for a company or the government. Upon receiving a non-proper response from any of the slave electronic elements, the Counter Responses 153 may be programmed to direct the Secure Master Element Logic 154 to shut down the all of the electronic elements to prevent any possible breach of the electronic device. The Counter Responses 153 may also vary depending on the particular slave electronic element (e.g., 102-104) that provides a non-proper response. In the example shown in FIG. 1, the Counter Responses 153 may specify the Secure Master Element Logic 154 to slow the clock speed if the non-proper response is received from the CPU 102 or a GPU 103. On the other hand, the Counter Responses 153 may specify the Secure Master Element Logic 154 to disable the wireless radios of the electronic device if a non-proper response is received from the WiFi Controller 101.

In FIG. 1, the exemplary network of secure electronic elements 100 also includes slave electronic elements, such as the CPU 102, the GPU 103, and the Memory Controller 104. Each slave electronic element may include a Secure Slave Element (e.g., 112-114). As an example depicted in FIG. 1, the Secure Slave Element 113 of the GPU 103 includes a Secure Communication Interface 120 in communication with a Secure Processor 130 and a Secure Memory 140. The Secure Memory 140 of the Secure Slave Element 113 may store Response Data 161, a Master Hierarchy List 162, Master Element Data 163, and Secure Slave Element Logic 164. The Slave Secure Element Logic 164 may be stored as processor executable instructions for responding to checks from the master electronic element (e.g., the WiFi Controller 101).

In response to functionality checks from the master electronic element, the Secure Slave Element Logic 164 may transmit the Response Data 161 to the master electronic element. The Response Data 161 may be data indicative of whether the particular slave electronic element is functioning properly. The Response Data 161 may be read from the slave electronic element itself (e.g., 102-104). For example, the slave electronic element may include functionality data arising from its normal operation (e.g., status values, counter or register values, or other operational data). Alternatively, the Secure Slave Element Logic 164 may periodically determine whether the slave electronic element is functioning properly (i.e., check the slave electronic element) and store the Response Data 161 in the Secure Memory 140 of the Secure Slave Element (e.g., 112-114).

In FIG. 1, the Secure Slave Element 113 also stores a Master Hierarchy List 162 and Master Element Data 163 in its Secure Memory 140. In one implementation, the Master Hierarchy List 162 may include data indicating which slave electronic element should become the new master electronic element if the current master electronic element stops functioning properly. The Master Element Data 163 may include data and instructions for configuring the particular slave electronic element to become the new master electronic element. As an example shown in FIG. 1, the Master Element Data 163 stored for Secure Slave Element 113 may include a Secure Network Element List 151, Secure Check Parameters 152, Counter Responses 153, and Secure Master Element Logic 154, allowing the Secure Slave Element 113 to operate as a master electronic element.

Figure 2:
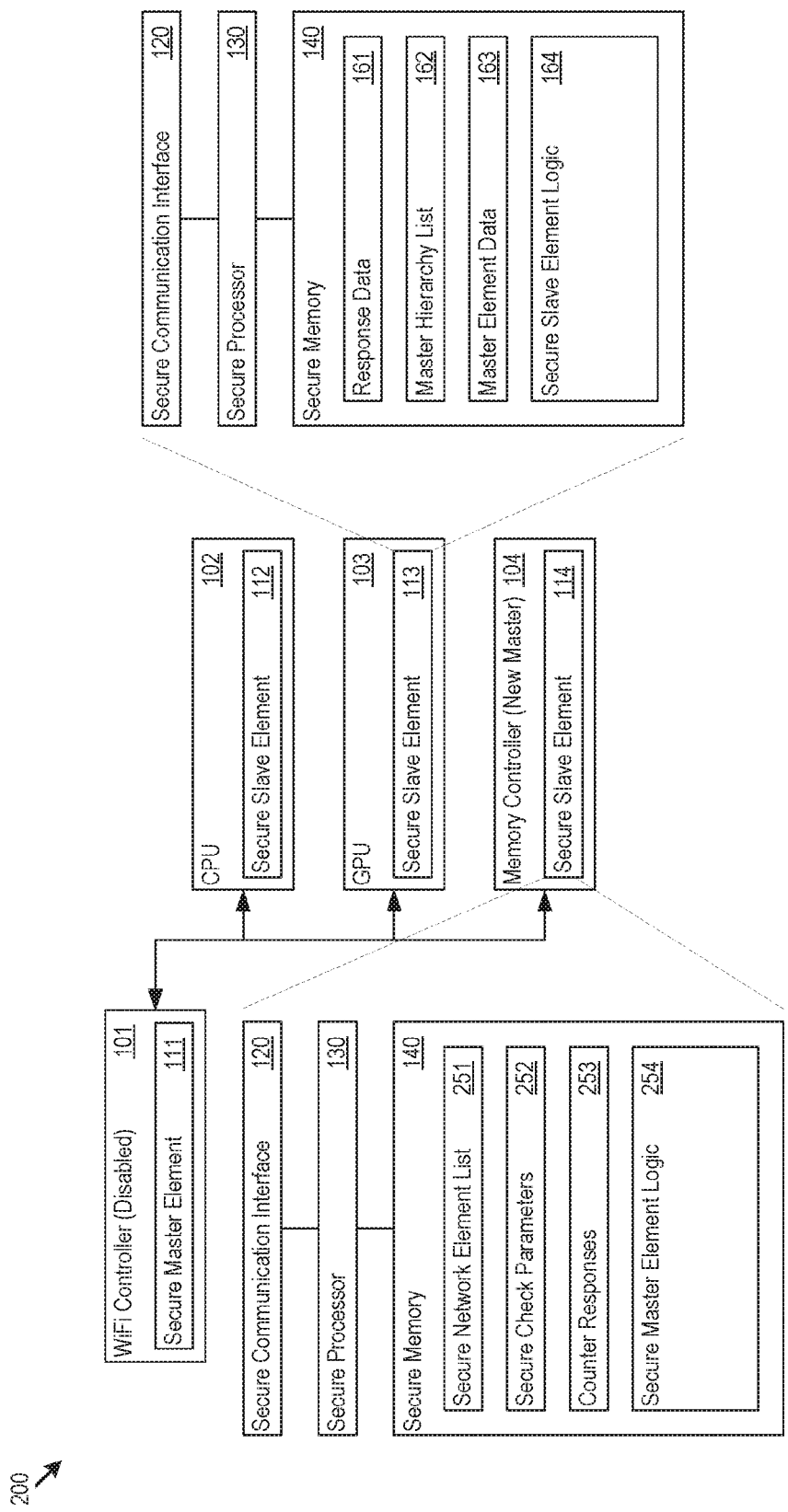
FIG. 2 shows an exemplary network of secure electronic elements.

FIG. 2 discusses a slave electronic element becoming a new master electronic element in greater detail. FIG. 2 shows an exemplary network of secure electronic elements 200. In the exemplary network of secure electronic elements 200 shown in FIG. 2, the slave electronic elements (e.g., 102-104) have previously determined that the WiFi Controller 101 master electronic element was not functioning properly. The Secure Slave Element Logic 164 of a slave electronic element may recognize that the master electronic element is not functioning properly when the master electronic element no longer (or too frequently) checks the slave electronic element, when the master sends unintelligible, incorrect, or unexpected messages, or under other conditions. For example, the CPU 102 may have determined that the WiFi Controller 101 master electronic element was no longer checking the CPU 102 every 5 milliseconds. Likewise, the GPU 103 may recognize that the WiFi Controller 101 was no longer checking the GPU 103 every 10 milliseconds.

When a master electronic element has stopped functioning properly (e.g., stopped checking the slave electronic elements), the slave electronic elements may assign a new master electronic element by referring to the Master Hierarchy List 162. The Master Hierarchy List 162 may specify the order of succession for master electronic elements should the previously listed master electronic elements no longer function properly. In the example shown in FIG. 2, the Master Hierarchy List 162 specified the Memory Controller 104 to become the new master electronic element if the WiFi Controller 101 stop functioning properly. Accordingly, upon determining the WiFi Controller 101 was no longer sending functionality checks, the slave electronic elements assigned the Memory Controller 104 to be the new master electronic element.

As the new master electronic element, the Memory Controller 104 may utilize the data stored in its Master Element Data to check slave electronic elements in the network 200. For example, the Master Element Data of the Memory Controller 104 may include a Secure Network Element List 251, a Secure Check Parameters 252, a Counter Responses 253, and Secure Master Element Logic 254, allowing the Memory Controller 104 to act as the new master electronic element. As the new master electronic element, the Memory Controller 104 may establish a communication channel with the slave electronic elements (i.e., the CPU 102 and the GPU 103). The Memory Controller 104 may also reduce the functionality capability (e.g., disable) of the previous master electronic element that was not functioning properly. In FIG. 2, the WiFi Controller 101 has been disabled by the new master electronic element, the Memory Controller 104. If Memory Controller 104 was no longer functioning properly, the network 200 may employ a similar process to assign a new master electronic element.

Figure 3:
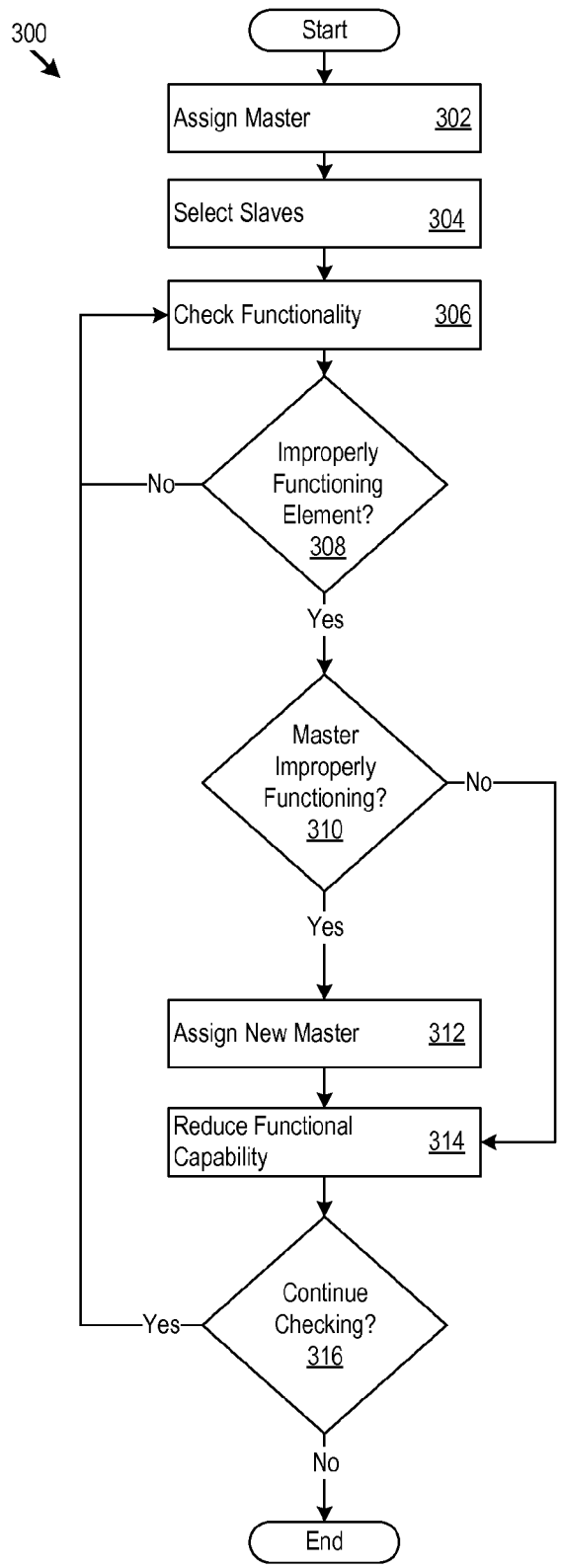
FIG. 3 shows an example of logic that electronic elements may execute to secure a network.

FIG. 3 shows an example of logic 300 that electronic elements may execute to secure a network. For example, the logic 300 may be implemented, at least in part, as master element logic, such as the Secure Master Element Logic 154. The logic 300 may also be implemented, at least in part, as slave element logic, such as the Secure Slave Element Logic 164. The logic 300 may begin execution when the electronic device is powered on, upon which a master electronic element may be assigned (302). An electronic element may be preprogrammed to be the initial master electronic element. For example, during the testing phase of the manufacturing process, the manufacturer may pre-program a particular electronic element in the network of secure electronic elements 100 or 200 to be the initial master electronic element. As an alternative implementation, multiple master electronic elements may be selected, each of which may check selected electronic elements in the network 100 or 200. As another implementation, all of the electronic elements may be preprogrammed to be master electronic elements, whereupon each electronic element would check each of the other electronic elements in the network 100 or 200. The initial master electronic element (and succession of master electronic elements) may also be programmed in the Master Hierarchy List 162.

Next, the Secure Master Element Logic 154 of the master electronic element may select the particular slave electronic elements to check for proper functionality (304). As described above, the Secure Master Element Logic 154 may select which slave electronic elements to check through the Secure Element Network List 151. The Secure Master Element Logic 154 may check, at defined times, whether each selected slave electronic element is functioning properly (306). The Secure Master Element Logic 154 may determine if a slave electronic element is improperly functioning by recognizing an improper response (308). Similarly, the Secure Slave Element Logic 164 of each respect slave electronic element may determine the master electronic element is functioning improperly (306) by recognizing the master electronic element is no longer checking on the slave electronic elements (308).

The response of the secure elements to an improperly functioning element may vary depending on whether the improperly functioning element is the master or a slave (310). If the improperly functioning element is a slave electronic element, the Secure Master Element Logic 154 may reduce the functional capability of the improperly functioning electronic element (314). In another respect, the Secure Master Element Logic 154 may reduce the functional capability of a separate electronic element as well. For example, the Secure Master Element Logic 154 may determine the Memory Controller 104 is improperly reading out data from the memory. The Secure Master Element Logic 154 may respond by reducing the functional capability of the Memory Controller 104, the WiFi Controller 101, and a network adapter (not pictured) to prevent any read data from being transmitted outside of the electronic device.

As discussed above, If the improperly functioning element is the master electronic element, the slave electronic elements may assign a new master electronic element based on the Master Hierarchy List 162 (312). The new master electronic element may then reduce the functional capability of the previous master electronic element (314). The master electronic element (whether initially preprogrammed or newly assigned) may then continue checking (316) the functionality of the selected slave electronic elements in the network 100.

The secure communication interface 120, secure processor 130, and secure memory 120 may be secure in many different senses. As examples, the secure communication interface 120, secure processor 130, and secure memory 120 may be difficult to access physically or electrically. As examples, the secure communication interface 120, secure processor 130, and secure memory 120 may be located in a difficult to access part of the device, may be hidden or incorporated into other circuitry, including the circuitry of the electronic elements (e.g., 101-104), or may be covered in a protective coating (e.g., a sealing epoxy). As additional examples, the secure communication interface 120, secure processor 130, and secure memory 120 may be connected via encrypted communication channels, may communicate through multiple secure channels, may be monitored by tamper detecting sensors, including temperature, light, and access sensors in the device, or may be secured in other ways.

Figure 4:
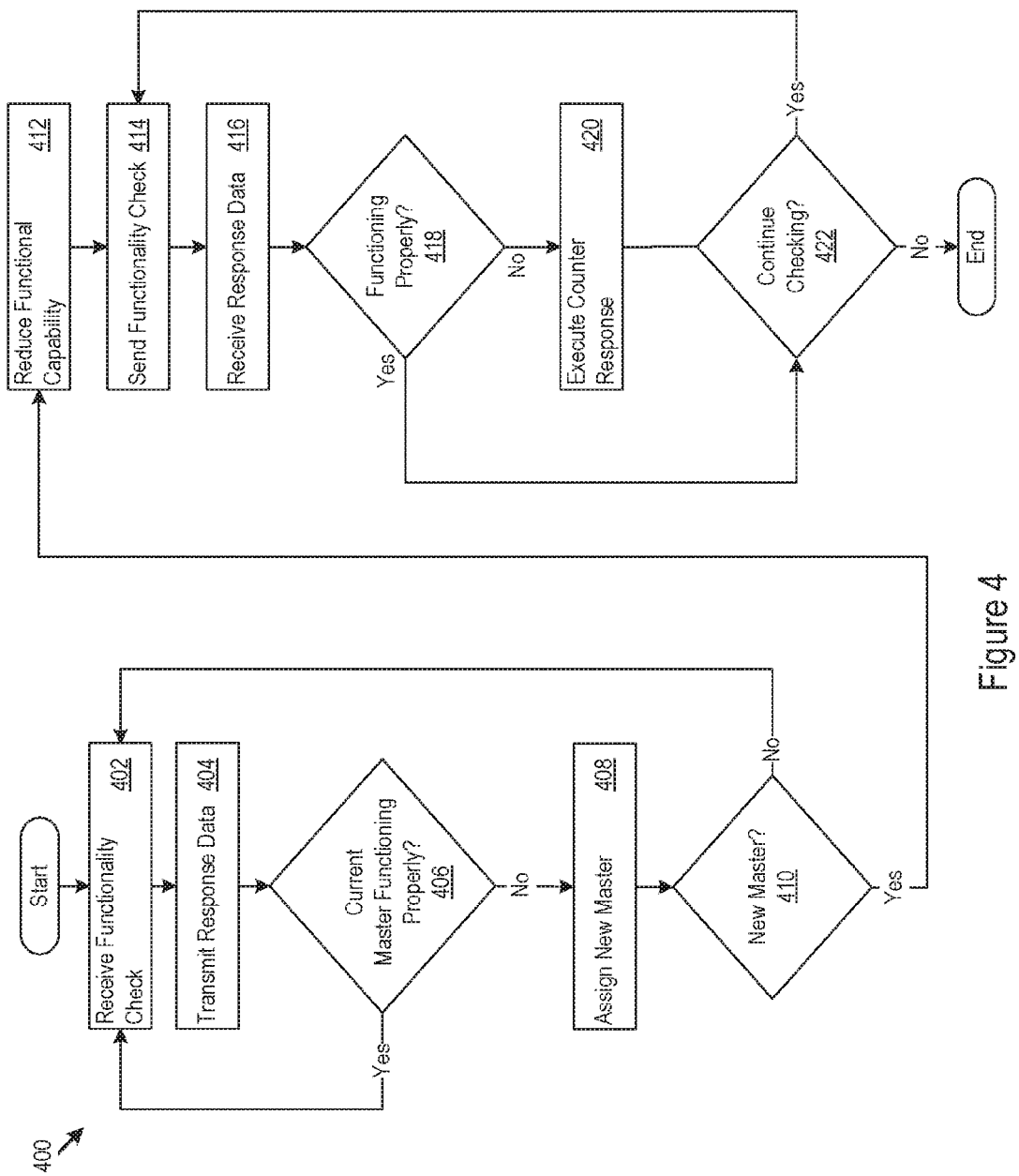
FIG. 4 shows an example of logic that an electronic element may execute to the secure a network.

FIG. 4 shows an example of logic 400 that an electronic element may execute to the secure a network. As one example, the logic 400 may be implemented as slave element logic, such as the Secure Slave Element Logic 164. The slave element logic may be executed by a processor on an electronic element, for example a slave electronic element. The slave element logic may receive a functionality check from the current master electronic element (402). The slave element logic may transmit a response message, such as response data, to the current master electronic element upon receiving the functionality check (404). The slave element logic may also determine when the current master electronic element is no longer functioning properly (406), for example by identifying when functionality checks from the current master electronic element are no longer being received, are being received at an unexpected frequency, contain incorrect data, contain unintelligible data, or any combination thereof. If the slave element logic determines that the current master electronic element is functioning properly, the slave element logic may continue to receive functionality checks from the current master electronic element (402).

If the slave element logic determines that the current master electronic element is no longer functioning properly, the slave element logic may assign a new master electronic element (406). In one example, the slave element logic may assign the new master electronic element in conjunction with other slave element logic or other slave electronic elements. The slave element logic may also assign the new master electronic element by using other data, such as the Master Hierarchy List 162. The slave element logic may then identify whether the slave element logic or the electronic element executing the slave element logic has been assigned as the new master electronic element (410). If the slave element logic or the electronic element executing the slave element logic is not the new master electronic element, the slave element logic may receive functionality checks from the new master electronic element (402).

If the slave element logic or the electronic element executing the slave element logic is the new master electronic element, the slave element logic may reduce the functional capability of the former master electronic element (referred to above as the current master electronic element). The slave element logic may then function as the new master electronic element. For example, the slave element logic may send a functionality check to a selected electronic element (414), receive response data from the selected electronic element (416), identify whether the selected electronic element is not functioning properly (418), and execute a counter response when the selected electronic element is not functioning properly (420). A memory (e.g., a secure memory 140) may store counter response data that specifies available counter responses to be executed when the selected electronic element is not functioning properly. The slave element logic may select the counter response that is executed from among the available counter responses. In one implementation, the slave element logic may select a counter response from the counter response data based on the response data received from the selected electronic element. The slave element logic may then continue (422) to check functionality of selected electronic elements in the network (e.g., 414-420).

In one implementation, a network of electronic elements in communication with one another may include an electronic element that can assign a master electronic element from among the network of electronic elements. The master electronic element may check, at defined times, that selected electronic elements in the network are functioning properly, identify an improperly functioning electronic element from among the selected electronic elements, and execute a counter measure response that affects functional capability of the improperly functioning electronic element. The master electronic element may identify an improperly functioning electronic element by recognizing an improper response from one of the selected electronic elements. The master electronic element may execute a counter measure response that reduces the functional capability of the improperly functioning electronic element, reduces the functional capability of another electronic element that is not the improperly functioning electronic element, or prevents data associated with the improperly functioning electronic element from being transmitted outside of the electronic device.

In another implementation, a system may include a processor, a memory, a selected electronic element in communication with the processor, and master element logic stored in the memory. When the master element logic is executed by the processor, the system may be operable to cause the processor or system to check whether the selected electronic element is functioning properly, identify that the selected electronic element is not functioning properly, and execute a counter response when the selected electronic element is not functioning properly.

The master element logic may identify that the selected electronic element is not functioning properly by recognizing that a received response from the selected electronic element is an improper response. For example, the memory may store a response parameter that includes a proper response from the selected electronic element to compare against the received response. The memory may also store an improper response threshold parameter that can specify when improper responses received from the selected electronic element should trigger the counter response. The master element logic may also be operable to execute the counter response when the improper response threshold parameter is met.

The memory may also store a check timing parameter, a network element list, counter response data, or more. The check timing parameter may specify when the master element logic checks the selected electronic element. The network element list may include a list of electronic elements in communication with the processor. The master element logic may be operable to select a selected electronic element from the network element list. The counter response data may specify available counter responses that the master element logic may execute when the selected electronic element is not functioning properly. The master element logic may be operable to select the counter response that is executed from among the available counter responses.

In an additional implementation, a system may include a processor, a memory, and slave element logic stored in the memory. When executed by the processor, the slave element logic stored in the memory may be operable to receive a functionality check from a current master electronic element, transmit response data to the current master electronic element in response to receiving the functionality check, and assign a new master electronic element when the slave element logic determines that the current master electronic element is no longer functioning properly. After assigning the new master electronic element, the slave element logic may reduce the functional capability of the current master electronic element. The slave element logic may also be operable to send functionality checks after it has assigned itself as the new master electronic element.

The slave element logic may identify that the current master electronic element is no longer functioning properly when functionality checks from the current master electronic element are no longer being received, are being received at an unexpected frequency, contain incorrect data, contain unintelligible data, or any combination thereof.

The memory may also store a master hierarchy list stored that may specify a preferred order of electronic elements for being assigned the new master electronic element, and the slave element logic may assign the new master electronic element according to the master hierarchy list. Master element data that may specify parameters for use when the slave element logic has assigned itself as the new master electronic element may also be stored in the memory. The slave element logic may be operable to, using the master element data, check whether a selected electronic element is functioning properly, identify that the selected electronic element is not functioning properly, and execute a counter response when the selected electronic element is not functioning properly.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method comprising:
   in an electronic device comprising a network of electronic elements in communication with one another:
   assigning a primary electronic element from among the network of electronic elements, the primary electronic element configured to carry out health checks on other electronic elements in the network of electronic elements;
   determining, via a first secondary electronic element from among the network of electronic elements, when the primary electronic element functions improperly by:
     receiving a number of improper communications from the primary electronic element; and
     determining when the number of improper communications meets at least a threshold number of improper communications;
   accessing hierarchy data via the first secondary electronic element, the hierarchy data indicating a selected secondary electronic element from among the network of electronic elements to replace the primary electronic element;
   responsive to the hierarchy data, configuring the selected secondary electronic element to carry out the health checks instead of the primary electronic element; and
   disabling a transmission capability of a network adapter to prevent data from the primary electronic element from being transmitted outside of the electronic device,
   the selected secondary element configured to continue to carry out the health checks after the transmission capability is disabled.

2. The method of claim 1, further comprising reducing functional capability of the primary electronic element.

3. The method of claim 1, where the first secondary electronic element and the selected secondary electronic element comprise the same electronic element.

4. The method of claim 1, where the hierarchy data comprises a primary element succession listing for the network of electronic elements.

5. The method of claim 1, further comprising executing a counter measure, via the selected secondary element, responsive to the health checks.

6. The method of claim 1, where the improper communications comprise:
   incorrect data, contain unintelligible data, or both.

7. A system comprising:
   a processor;
   a memory;
   secondary element instructions stored in the memory and configured for execution by the processor to:
     receive a functionality check from a current primary electronic element;
     transmit response data to the current primary electronic element in response to receiving the functionality check;
     receive a number of improper communications from the current primary electronic element;
     when the number of improper communications is fewer than a threshold number of improper communications, determine that the current primary electronic element is functioning properly; and
     when the number of improper communications reaches at least the threshold number of improper communications:
       assign a new primary electronic element to transition the current primary electronic element to be a prior primary electronic element; and
       after assigning the new primary electronic element:
         reduce a functional capability of the prior electronic primary element;
         reduce a transmission capability of a network adapter to prevent data from being transmitted from the prior primary electronic element; and
         after the transmission capability is reduced, perform another functionality check.

8. The system of claim 7, wherein the secondary element instructions are further configured to:
   send functionality checks after becoming the new primary electronic element.

9. The system of claim 7, where the improper communications comprise incorrect data, contain unintelligible data, or both.

10. The system of claim 7, where the memory is configured to store a primary hierarchy list that specifies a preferred order of electronic elements for being assigned as the new primary electronic element; and
where the secondary element instructions are further configured to:
assign the new primary electronic element according to the primary hierarchy list.

11. The system of claim 7, where the memory is configured to store primary element data that specifies parameters for use by the new primary electronic element, and
where the secondary element instructions are further configured to, using the primary element data:
check whether a selected electronic element is functioning properly;
identify that the selected electronic element is not functioning properly; and
execute a counter response when the selected electronic element is not functioning properly.

12. The system of claim 7 further where the secondary element instructions are further configured to access a succession listing stored in the memory to determine the new primary electronic element.

13. A device comprising:
a network interface configured to establish a communication link to a network of electronic elements; and
secondary element circuitry in communication with the network interface, the secondary element circuitry configured to:
receive a number of improper communications from an existing primary electronic element;
when the number of improper communications is fewer than a threshold number of improper communications, determine that the existing primary electronic element is functioning properly; and
when the number of improper communications meets at least the threshold number of improper communications:
determine that the existing primary electronic element malfunctioned;
responsive to determining that the existing primary electronic element malfunctioned, determine to function as a new primary electronic element and transition the existing primary electronic element to be a prior primary electronic element;
reduce a functionality of the prior primary electronic element;
reduce a transmission capability of a communication interface to prevent data from being transmitted from the prior primary electronic element; and
after the transmission capability is reduced, perform a functionality check within the network of electronic elements.

14. The device of claim 13, further comprising memory configured to store hierarchy data; and
where the secondary element circuitry is further configured to determine to function as the new primary element based on the hierarchy data.

15. The device of claim 14, where the hierarchy data comprises a succession listing for the network of electronic elements.

16. The device of claim 13, further comprising memory configured to store primary electronic element configuration data; and
where the secondary element circuitry is further configured to function as the new primary electronic element based on the primary element configuration data.

17. The device of claim 16, where the primary electronic element configuration data is configured to indicate check parameters, counter responses, functionality check periodicity, or any combination thereof.

18. The device of claim 13, where:
the improper communications comprise incorrect data, unintelligible data, or any combination thereof.

19. The device of claim 13, where the secondary element circuitry is configured to reduce functionality of the prior primary element by reducing a clock speed of the prior primary element.

20. The device of claim 13, where the secondary element circuitry is further configured to execute a counter measure responsive to the functionality check within the network of electronic elements.

* * * * *